Feb. 17, 1925.  
L. J. STEPHENSON  
1,526,613  
DYNAMO ELECTRIC MACHINE  
Original Filed March 12, 1920   2 Sheets-Sheet 1

Inventor  
Leigh J. Stephenson  
By William Bradbury  
Attorneys

Feb. 17, 1925.

L. J. STEPHENSON 1,526,613

DYNAMO ELECTRIC MACHINE

Original Filed March 12, 1920    2 Sheets-Sheet 2

Inventor
Leigh J. Stephenson
By Williams, Bradbury
See, Attorneys.

Patented Feb. 17, 1925.

1,526,613

UNITED STATES PATENT OFFICE.

LEIGH J. STEPHENSON, OF CHICAGO, ILLINOIS.

DYNAMO-ELECTRIC MACHINE.

Application filed March 12, 1920, Serial No. 365,314. Renewed June 2, 1924.

*To all whom it may concern:*

Be it known that I, LEIGH J. STEPHENSON, a citizen of the United States, residing at Chicago, in the county of Cook and State of Illinois, have invented a certain new and useful Improvement in Dynamo-Electric Machines, of which the following is a full, clear, concise, and exact description, reference being had to the accompanying drawings, forming a part of this specification.

My invention relates to improvements in dynamo electric machines, and is particularly concerned with the construction of a new type of motor.

The objects of my invention are:

First: To provide a motor, the speed of which can be varied between zero speed and a maximum speed, without the employment of resistances or other devices for varying the voltage applied to the motor terminals;

Second: To provide a motor, the speed of which can be controlled by means of a counter-electromotive force generated in the windings of the motor;

Third: To provide a dynamo electric machine adapted to be driven from a source of direct current and comprising means whereby one or more direct currents can be obtained from the dynamo electric machine, the potentials of which can be varied from zero to a maximum value, and the potentials of which may differ from each other;

Fourth: To provide a dynamo electric machine adapted to be driven from a source of direct current, comprising means whereby alternating current or currents may be obtained from said dynamo electric machine, and means for controlling the frequency and potentials of said alternating currents from zero to a maximum value, as desired;

Fifth: To provide a direct current motor, the rotor of which is entirely unconnected with any source of current;

Sixth: To provide a direct current motor, in which the rotor current is induced;

Seventh: To provide a direct current induction motor comprising means whereby its speed may be adjusted as desired; and Eighth: To provide a direct current induction generator.

Other objects will appear as this description progresses, reference being had to the accompanying drawings, in which—

Figure 1:
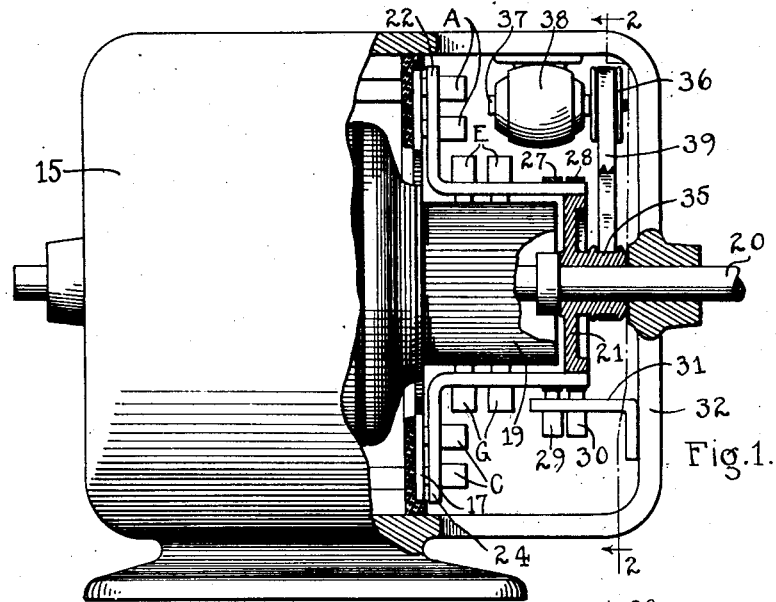
Figure 1 is a side elevation of a dynamo electric machine built in accordance with one embodiment of my invention, portions thereof being broken away for the purpose of better illustration.
Figure 2:
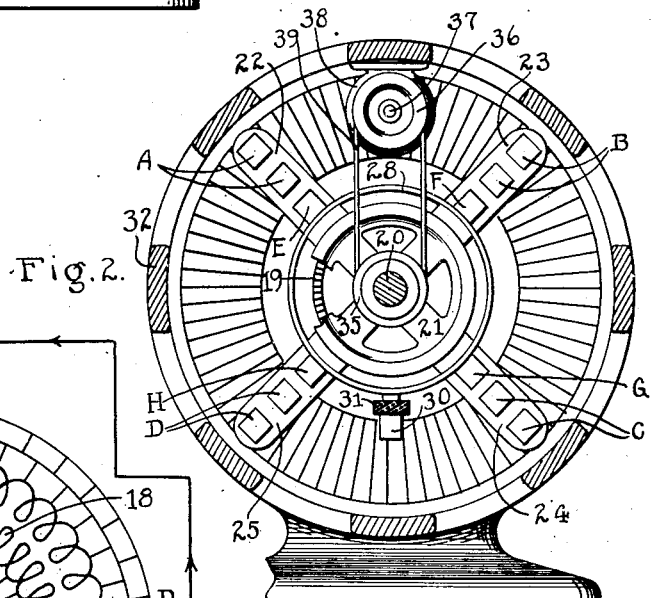
Figure 2 is a vertical transverse section taken on line 2—2 of Figure 1, showing the brush supporting spider in a different angular position from that shown in Figure 1.
Figure 7:
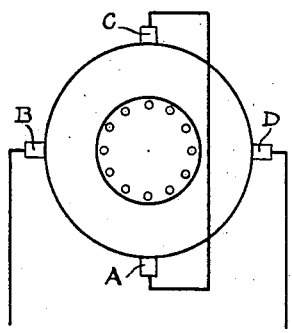
Figure 8:
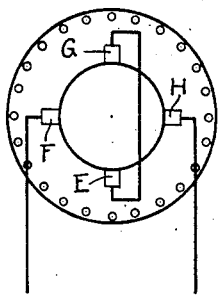
Figure 10:
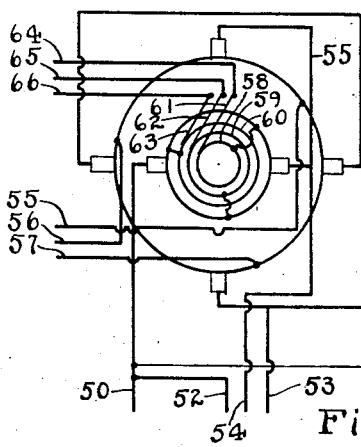

Figures 4, 5, 6, and 9 are diagrammatical views showing different modes of connecting the brushes of the machine illustrated in Figures 1 and 2;

Figures 7 and 8 are diagrammatical views illustrating certain modifications in the construction of the machine disclosed in Figures 1 and 2, and the connections of the brushes; and Figure 10 is a diagrammatical view showing a modified form of my invention, whereby either alternating or direct currents of any desired voltage and alternating currents of any desired frequency can be obtained from an apparatus driven from a direct current source.

Throughout the several views similar reference characters will be used for referring to similar parts.

Figure 3:
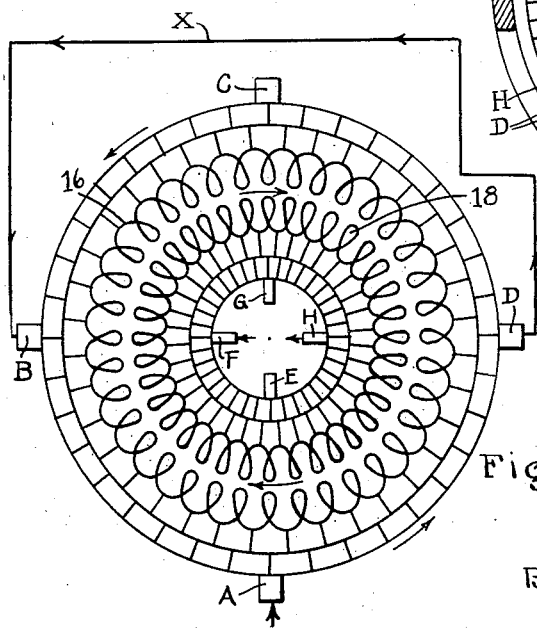
Figure 3 is a diagrammatical illustration of the connections between the brushes, commutators, and windings.

Referring for the present to Figures 1, 2 and 3, the reference character 15 indicates the field or stator frame of my improved dynamo electric machine, which is provided with a distributed winding 16 (see Figure 3) from which taps are brought out in the usual manner to the segments of a stationary commutator 17, which may be secured to the frame work of the machine in any desired manner.

The armature or rotor of my improved dynamo electric machine comprises a distributed winding 18, the taps from which are brought out to the segments of a commutator 19, which is secured to the rotor shaft 20 and rotates with the rotor winding. Rotatably mounted upon the shaft 20 is a spider 21, having four arms 22, 23, 24 and 25, each of which is spaced ninety degrees from the adjacent arms. The arms 22, 23, 24 and 25 carry the brushes A, B, C and D respectively, which contact with the stationary commutator 17, and the brushes E, F, G and H respectively, which contact with the rotating commutator 19. The arms 22, 23, 24 and 25 may be made of insulating material, so as to insulate the brushes from each other, but it is of course possible to make these arms of conducting material, and effect the same result by insulating the brushes from the supporting arms. A pair of collector rings 27 and 28 are secured to the horizontally extending portions of the arms 22, 23, 24, 25, and are supplied with current through the brushes 29 and 30, which are supported in insulated relation by the bracket 31, secured to the bearing pedestal 32 of the dynamo electric machine. By reference to Figures 4 to 10 inclusive it will be noted that there are a variety of different ways in which the various brushes can be connected with the source of current, and with each other, and I have consequently, in Figures 1 and 2, not shown any means for establishing electrical connections between the various brushes.

My invention contemplates means for rotating the spider 21 and the brushes A to H inclusive, about the shaft 20, and for this means I have provided the spider with an extension 35 forming a belt pulley, which is adapted to be connected with the belt pulley 36, secured to the shaft 37 of the small motor 38. The small motor 38 can be mounted as desired, but I prefer to have it mounted upon the framework of the dynamo electric machine, as shown in Figures 1 and 2. The two belt pulleys are connected by means of a belt 39.

Figure 4:
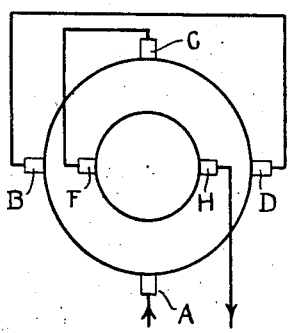

I shall first explain the operation of my invention in connection with the disclosures in Figures 3 and 4.

It will be noted that in these two figures the brushes are so connected that current from the line wires enters at the brush A, passes through the two halves of the stator winding 16 in parallel, leaves at the brush C, enters the rotor winding 18 through the brush F, passes through the two halves of the rotor winding in parallel, and returns to the line through the brush H. With the construction shown in Figure 4 the brushes E and G are idle.

With the brushes at rest, the current merely passes through the stator and rotor windings in series, and since the brushes supplying current to these two windings are at right angles to each other, the poles created by the current in the rotor and stator will set up two opposing fields, which will tend to cause the rotor to rotate in a given direction, depending upon the direction in which the stator and rotor windings are wound. For the purpose of this explanation I shall assume that the windings on the rotor and stator are wound in the same directions, and that south poles are created at the points where the current enters the stator and the rotor, that is, at the brushes A and F. These magnetic poles will react upon each other to produce rotation of the rotor in the direction of the arrow, lying between the stator and rotor windings. It will therefore be seen that under the conditions named, that is, with the brushes at rest, my improved dynamo electric machine functions merely as a series motor.

Under the condition of operation just described, the short circuiting conductor X merely connects points of equal potential on the stator winding, and has no effect upon the operation of the motor.

I shall next assume another limiting condition of operation, in which the brushes will all be assumed to be rotated at a high speed in a counter-clockwise direction. As stated above, a south pole is formed in the stator at the point where the current enters this winding, that is, at the brush A. Consequently a north pole will be formed in the stator immediately under the brush C. When the brushes are rotated, these poles will necessarily rotate with the brushes, and since the magnetic flux created by the stator winding traverses not only the stator, but the rotor iron, the rotation of this flux produced by the rotation of the brushes, will cause it to cut both the stator and rotor windings, thereby inducing a potential in these windings. The potentials generated in the stator and rotor windings are, comparatively speaking, small, and the potential generated in the rotor winding is a counter-electromotive force. The brushes B and D connect the points of maximum difference of potential in the stator winding, generated by the rotating field, and cause a current to flow in the short circuiting winding in the direction of the arrows.

Since both of the windings are comparatively low resistance windings, the comparatively small difference of potential set up between the brushes B and D will cause a heavy current to flow through the short circuit X and the stator windings. This current will set up a south pole under the brush B and a north pole under the brush D, these poles being very strong in comparison with those set up under the brushes A and C, referred to above. Since the brushes B and D rotate with the brushes A and C, the field set up under these brushes will be rotated in the same manner that the poles set up under A and C rotate, and the flux formed by the short circuited current will cut both the rotor and stator windings, thereby generating in these windings a comparatively high potential. The potential generated in the stator winding has its points of maximum difference of potential under the brushes A and C, and is a counter-electromotive force. The potential generated in the rotor winding has its points of maximum difference of potential in a line extending at right angles to the brushes F and H, and since the potentials induced in each half of the rotor windings oppose each other, they simply neutralize each other and have no effect upon the operation of the motor.

The counter-electromotive force generated in the stator winding and having its points of maximum difference of potential under the brushes A and C is the counter-electromotive force which is principally effective in determining the current taken by the motor.

It will be apparent from the above description that the counter-electromotive force generated in the stator winding is dependent upon the speed of rotation of the brushes. Assuming that the brushes are operating at their highest speed, and with the rotor at a standstill, the counter-electromotive force generated will be such as to merely permit a magnetizing current to flow through the stator and rotor windings. Consequently the torque produced will be small.

From other considerations it will also be clear that no torque is being developed at this time, for the reason that the south pole created by the rotor winding is at F, and this pole lies directly under the south pole created at B in the stator by the short circuited current, and consequently there is no reaction between these poles in a direction tending to produce rotation.

In order to produce sufficient torque to start the motor under load, the speed of rotation of the brushes must be reduced. For the purpose of simplifying the explanation I shall hereafter refer to the counter-electromotive force generated by the rotation of the brushes as the brush counter-electromotive force, and the counter-electromotive force generated by reason of the rotation of the rotor relative to the stator, the rotation counter-electromotive force. As the speed of the brushes decreases, the brush counter-electromotive force decreases, because of the reduction in the strength and the speed of rotation of the magnetic fields set up under brushes B and D. This reduction in the brush counter-electromotive force permits more current to flow through the motor windings, thereby strengthening the poles set up under the brushes A and C. So far in my description I have described the operation of my improved motor as though there were two separate south poles created by the stator winding, one under the brush A and one under the brush B. As a matter of fact there is but a single south pole created by the stator winding, and a corresponding north pole, these poles being the resultant of the south poles set up under the brushes A and B and the north poles set up under the brushes C and D respectively. It will therefore be seen that if the component under A of the resultant south pole is strengthened by the increased flow of current through the motor, permitted by reduction in speed of the brushes, and the component under the brush B of the resultant south pole at the same time decreases, the resultant south pole of the stator will shift toward the brush A. There will accordingly be a reaction between the resultant south pole of the stator and the south pole of the rotor under the brush F, which will tend to cause rotation of the rotor. The torque thus developed becomes greater the greater the reduction in the speed of rotation of the brushes, until sufficient torque is developed to start rotation of the rotor. A still further decrease in the speed of rotation of the brushes will permit a still greater flow of current through the motor winding, thereby generating a greater torque and causing the motor to accelerate, until, when the speed of the brushes has been decreased to zero, the motor will be operating at its highest speed for any given load.

As soon as the rotor begins to rotate, its conductors will cut the field set up under brushes A and B, and a counter-electromotive force of rotation will be generated in the rotor winding, the value of which depends upon the speed of rotation and the strength of the fields under the brushes A and C, the same as in an ordinary series motor. There will also be a counter-electromotive force generated in the rotor winding, due to the fields under the brushes B and D, but the components of this counter-electromotive force oppose each other, and will therefore neutralize each other, so that this counter-electromotive force has no effect upon the operation of the motor.

From the above description it will be clear that with the construction described above the speed of rotation of the motor is determined solely by the counter-electromotive forces generated in the windings thereof, and that these counter-electromotive forces are in turn dependent upon the speed of rotation of the brushes. I have therefore provided a motor, the operation of which can be controlled without the use of any external means, such as rheostats or other similar devices for varying the potential applied to the terminals of the motor. Since the operation of my improved motor is controlled solely by counter-electromotive forces induced in these windings, it can be operated much more efficiently than those motors in which resistances or other similar devices are used for controlling the operation thereof.

Figure 5:
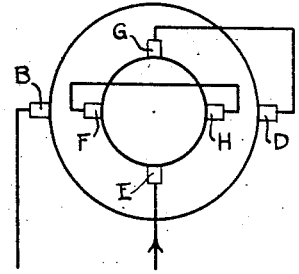

In Figure 5 I have illustrated the electrical connections of the brushes for a modified form of my invention, in which the brushes F and H of the rotor are short circuited, and in which the brushes A and C of the modification shown in Figure 4 are dispensed with. With this construction, primary north and south poles are set up under the brushes G and E respectively, the rotation of which causes secondary north and south poles to be induced under the brushes H and F respectively. The rotation of these secondary fields produces a brush counter-electromotive force in the rotor windings, between the brushes G and E. A counter-electromotive force of rotation is likewise produced under the brushes G and E by the rotation of the rotor relative to the poles under the brushes B and D. Otherwise, the operation of the modified form shown in Figure 5 is similar to that shown in Figures 3 and 4.

Figure 6:
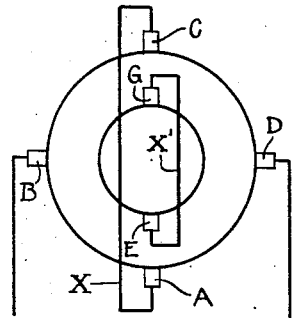

The motor diagrammatically illustrated in Figure 6 comprises a stator and a rotor, both of which are provided with distributed windings. The rotor winding is provided with a commutator, upon which the brushes G and E bear, these brushes being short-circuited by the conductor X'. The stator is provided with brushes A, B, C, D, the brushes B and D being connected with the line, and the brushes A and C being short circuited by the conductor X. With this construction the rotation of the poles set up under brushes B and D generates an electromotive force, the points of maximum difference of potential of which are connected by the brushes A and C by the conductor X. A comparatively strong field having poles under the brushes A and C is set up in the stator, as described in connection with Figures 3 and 4. At the same time, the rotation of the poles under the brushes B and D will, assuming the rotor to be stationary, generate a potential in the rotor winding, which will produce a large current in the short circuit X'. The current generated in the rotor will be in such direction as to set up poles of opposite polarity to the poles set up under the adjacent brushes on the stator. The poles on the stator will consequently attract the poles on the rotor, and because of the rotation of the poles formed by the stator winding, due to the rotation of the brushes, the rotor will be caused to accelerate. This will cause a decreased rate of cutting by the rotor conductors of the field having its poles under the brushes B and D, and a consequent reduction in the current flowing through the short circuit X', and of the torque produced, until the rotor comes into cynchronism with the brushes, at which point there will be no relative rotation of the rotor conductors and the field having the poles set up under the brushes B and D, and consequently no current flowing in the rotor windings, and no torque produced. If, now, a load is placed upon the motor, it will cause the speed of the rotor to decrease, thereby causing the field produced by the rotating brushes B and D to cut the conductors of the rotor, and induce sufficient current in the rotor winding to generate the required torque.

From the above description of the construction shown in Figure 6, it will be seen that the operation of this embodiment of my invention is very similar to that of an ordinary induction motor, except that in my construction the rotating field in produced by the rotation of the brushes bearing upon the stator commutator.

The embodiment of my invention illustrated in Figure 7 is similar in operation to that shown in Figure 6, the only difference in the construction being that in Figure 7 I substitute a squirrel cage rotor for the short circuited wound rotor of Figure 6. Otherwise the constructions are similar except that with the use of a squirrel cage rotor there is a better flux distribution than is obtainable by the use of a wound rotor, in which the currents are confined to certain limited paths. This difference between the mode of operation of a wound rotor and a squirrel cage rotor is well known to those skilled in the induction motor art, and need not be enlarged upon here.

The construction shown in Figure 8 merely illustrates a reversal of the embodiment shown in Figure 7, the rotor being a wound rotor and the stator being in the form of a squirrel cage stator.

Figure 9:
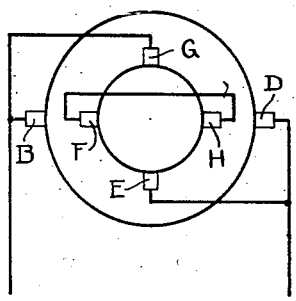

In Figure 9 I have illustrated a form of my invention which differs from that shown in Figure 5, in that the stator winding is connected in shunt to the rotor winding, in place of in series with the rotor winding, as in Figure 5. In this embodiment, as in the embodiment shown in Figure 5, the brush counter-electromotive force and the counter-electromotive force of rotation are both generated in the rotor winding.

The dynamo electric machine illustrated in Figure 10 is similar to that shown in Figure 4, except that I have provided certain additional connections to the windings of the construction shown in Figure 4, whereby one or more direct currents, the voltages of which differ from the voltage impressed upon the dynamo electric machine by the line wires, may be taken from the dynamo electric machine. It also includes means whereby an alternating current of any desired voltage and frequency from zero to the maximum limit can be derived from the machine. It will also be seen as the description pregresses that both direct current and alternating current can be taken from the dynamo electric machine at the same time.

I shall first describe the construction whereby I can derive direct currents of any voltage from zero to substantially line voltage. In Figure 10 the reference characters 50 and 51 indicate the line wires leading to the dynamo electric machine, and which are intended to supply it with direct current for causing it to function initially as a motor. A direct current tap 52 is connected with the line wire 50 and the direct current tap 53 is connected with the line wire 51. The direct current tap 54 is connected with a conductor 55, which connects the rotor and the stator in series, so that it can be used in connection with tap 52 to take currents off at the potential of the rotor, or in connection with tap 53, to take currents off at the potential of the stator.

From the preceding description of Figure 4 is will be clear that the potential across the rotor terminals increases with decrease in brush speed, and that the potential across the stator decreases with brush speed. Consequently, with the highest brush speed the potential across the taps 52 and 54 will be zero, and the potential across taps 53 and 54 will be substantially equal to line voltage. As the brush speed is decreased, the potential across the taps 52 and 54 will increase, and across the taps 53 and 54 will decrease until with zero brush speed the first mentioned potential will be substantially line voltage, and the second potential zero. With the above arrangement it is therefore possible to obtain direct current voltages of any desired value between zero and substantially line voltage merely by altering the speed of the brushes.

In this same figure I have shown alternating current taps 55, 56 and 57, which are connected at equally spaced points with the stator winding, and from which alternating current can be derived in the same manner that alternating current is derived from the winding of an inverted rotary converter. The voltage and the frequency of this alternating current will of course depend upon the speed of rotation of the brushes, both being at a maximum when the brushes are rotating at top speed, and zero when the brushes are at a standstill. At intermediate brush speeds the frequency and voltage will be somewhere between zero and the maximum values. The maximum value of the voltage will, of course, be a certain definite percentage of the direct current voltage.

While I have shown taps for three phase alternating current, it will of course be understood that any number of taps may be used, and currents of any number of phases may be obtained.

To obtain alternating current from the rotor, it may be provided with the slip rings 58, 59 and 60, which are connected with the rotary winding at equally spaced points.

Brushes 61, 62 and 63 co-act with the slip rings 58, 59 and 60 to supply current to the taps 64, 65 and 66 respectively. The frequency and the voltage of the alternating current taken off by the taps 54, 55, and 56, will vary inversely with the speed of the brushes. By using the proper number of slip rings, currents of any desired number of phases can be generated by the rotor.

I have explained above that the speed of my improved motor is controlled by adjusting the speed of the brushes. In Figure 10 I have disclosed means whereby the speed of the brushes can be controlled. In this figure the reference character 38' represents the armature of the motor 38, used for driving the brushes. The motor is provided with two field windings, namely, the shunt winding 70 and the series winding 71, which may be included in the motor circuit by closing the switch 72. An adjustable rheostat 73 is included in the circuit of the shunt field winding 70, and a similar adjustable rheostat 74 is included in the armature circuit of the motor.

To start the motor, the brushes will be brought up to their top speed by first adjusting the rheostat 73 to give the motor as strong a field as possible with the armature circuit open. The armature circuit is then closed and the adjustable resistance 74 cut out to accelerate the motor. The resistance of the adjustable rheostat 73 can then be included in the shunt field winding circuit to accelerate the motor still further. The speed of the motor can be adjusted by small gradations by the proper manipulation of the rheostats 73 and 74 to give the necessary speed to the brushes.

Assuming the motor to be operating at a given speed, if the load is increased the rotor speed decreases. To bring the motor back to its original speed it will then be necessary to slow down the brushes. With the arrangement shown in Figure 10 this can be automatically accomplished by connecting the series field winding 71, so that it will assist the shunt field winding 70. With this arrangement, when an additional load is imposed upon the motor, the rotor will tend to slow down, thereby permitting more current to flow through the motor. This increase in current will strengthen the field produced by the field winding 71, thereby causing the motor 38, and consequently the brushes, to decrease in speed. This decrease in speed of the brushes will cause the motor to increase its speed. If the field winding 71 is connected so as to oppose the field winding 70, then with increase in load there will be a tendency for the brushes to increase in speed, and the inherent tendency for the motor to decrease in speed under load will be exaggerated.

While I have described the details of the preferred embodiment of my invention and its principal uses, it is to be clearly understood that my invention is not limited to these details and uses, but is capable of other adaptations and modifications within the scope of the appended claims.

Having thus described my invention, what I claim is:

1. A dynamo electric machine comprising a distributed winding stator, a distributed winding rotor, a rotor shaft, a stationary commutator connected with said stator winding, a commutator connected with said rotor winding, and rotatable therewith, brushes for said commutators, a spider mounted on said rotor shaft and rotatable with respect thereto, the said brushes being mounted on said spider, means for supplying current to said brushes, comprising slip rings mounted on said spider, means for short circuiting one of said windings at a point intermediate the points of contact with the brushes bearing thereon, and means for rotating said spider, comprising a motor having a field winding connected with one of said first-named windings, so that the current in said field winding is proportional to the current in the winding with which it is connected.

2. A dynamo electric machine comprising a distributed winding stator, a distributed winding rotor, a rotor shaft, a stationary commutator connected with said stator winding, a commutator connected with said rotor winding and rotatable therewith, brushes for said commutators, a spider mounted on said rotor shaft and rotatable with respect thereto, the said brushes being mounted on said spider, means for supplying current to said brushes, comprising slip rings mounted on said spider, means for short circuiting one of said windings at a point intermediate the points of contact with the brushes bearing thereon, and means for rotating the said spider, comprising a motor, so connected with a circuit of said dynamo electric machine that its speed is controlled by the current in a portion of said circuit.

3. A dynamo electric machine comprising a distributed winding stator, a distributed winding rotor, a rotor shaft, a stationary commutator connected with said stator winding, a commutator connected with said rotor winding, and rotatable therewith, brushes for said commutators, a spider mounted on said rotor shaft and rotatable with respect thereto, the said brushes being mounted on said spider, means for supplying current to said brushes, comprising slip rings mounted on said spider, means for short circuiting one of said windings at a point intermediate the points of contact with the brushes bearing thereon, and means for rotating said spider.

4. A dynamo electric machine comprising a distributed winding stator, a distributed winding rotor, a rotor shaft, a stationary commutator for said stator winding, a commutator for said rotor, rotatable with said rotor, brushes for said commutators, adjustable means for rotating said brushes with respect to both commutators, means for short circuiting one of said windings at a point intermediate the points of contact with the brushes bearing thereon, and means for supplying current to said brushes.

5. A dynamo electric machine comprising a stator winding, a distributed winding rotor, a rotor shaft, a stationary commutator for said stator winding, a commutator for said rotor winding, rotatable with said rotor, brushes for both commutators, adjustable means for rotating said brushes with respect to both commutators, means for short circuiting one of said windings at a point intermediate the points of contact with the brushes bearing thereon, and means for supplying current to said brushes.

6. A dynamo electric machine comprising a stator, a rotor, a rotor shaft, a stationary commutator for said stator winding, a commutator for said rotor, rotatable with said rotor, brushes for both commutators, adjustable means for rotating said brushes with respect to both commutators, means for short circuiting one of said windings at a point intermediate the points of contact with the brushes bearing thereon, and means for supplying current to said brushes.

7. A motor comprising a stator winding and a rotor winding, connected in series, and means for inducing a counter-electromotive force substantially equal to line voltage in said stator winding, while said rotor and stator are stationary relatively to each other.

8. A motor comprising a stator winding and a rotor winding, connected in series, and means for inducing a counter-electromotive force substantially equal to line voltage in one of said windings, while said rotor and stator are stationary relatively to each other.

9. A motor comprising a stator winding and a rotor winding, and means for inducing a counter-electromotive force substantially equal to line voltage in said stator winding, while said rotor and stator are stationary relatively to each other, and while drawing a magnetizing current only from the line.

10. A motor comprising a stator winding and a rotor winding, and means for inducing a counter-electromotive force substantially equal to line voltage in one of said windings, while said rotor and stator are stationary relatively to each other, and while drawing a magnetizing current only from the line.

11. A direct current motor comprising a stator winding and a rotor winding connected in series, means for supplying current to said windings, means for causing a counter-electromotive force to be developed in both of said windings, and means for varying the counter-electromotive force developed in one of said windings.

12. A direct current motor comprising a stator winding and a rotor winding connected in series, means for supplying current to said windings, means for causing a counter-electromotive force to be developed in both of said windings.

13. A motor comprising a stator winding, a rotor winding, and means movable independently of both of said windings, for controlling the supply of current to said windings, to cause magnetic fields to be created by said windings, said magnetic fields reacting upon each other to cause relative movement of said windings, and means controlling said last named means, to vary the strength and position of said reacting magnetic fields, whereby the torque and speed of said motor can be varied.

14. A motor comprising a stator winding, a rotor winding, and means movable independently of both of said windings, for controlling the supply of current to said windings, to cause magnetic fields to be created by said windings, said magnetic fields reacting upon each other to cause relative movement of said windings, and means to vary the strength and position of said reacting magnetic fields, whereby the torque and speed of said motor can be varied.

15. A direct current motor comprising a stator winding, a rotor winding, means for controlling the supply of current to said windings, to cause rotating magnetic fields to be created by said windings, said magnetic fields reacting upon each other to cause relative movement of said windings, and means independent of the speed of said rotor for varying the strength and position of said reacting magnetic fields, whereby the torque and speed of said motor can be varied.

16. A direct current motor comprising two windings movable relatively to each other, means for supplying current to said windings, means for causing the current in one of said windings to induce a potential in the other of said windings, and means independent of the speed of the movable winding for controlling said last named means to regulate the speed of said motor.

17. A direct current motor comprising two windings movable relatively to each other, means for supplying direct current to said windings, and means for causing the current in one of said windings to induce a potential in the other of said windings, distinct from the potential generated by the relative movement of said windings.

18. A motor comprising two relatively movable windings, means movable independently of said windings, for causing a counter-electromotive force to be generated in one of said windings, and means for controlling said generated counter-electromotive force to adjust the speed of said motor.

19. A motor comprising two relatively movable windings, means for causing a counter-electromotive force to be generated in one of said windings, and means independent of the speed of the movable winding for controlling said generated counter-electromotive force to adjust the speed of said motor.

20. A direct current motor comprising a pair of relatively movable windings, one of which is adapted to be connected to a source of current, and adjustable means independent of the speed of said motor for causing a counter-electromotive force to be generated in said winding.

21. A motor comprising in combination two relatively movable windings connected in series, and adjustable means for inducing a counter-electromotive force in one of said windings, effective for varying the current therethrough to adjust the speed of said motor.

22. A motor comprising two windings movable relatively to each other to produce a counter-electromotive force of rotation, means for inducing another counter-electromotive force in one of said windings, and means for varying said last named counter-electromotive force to adjust the speed of said motor.

23. A motor comprising means for inducing two counter-electromotive forces therein, one of which is dependent upon the speed of said motor and one of which is independent of the speed of said motor, and means for varying said last named counter-electromotive force to vary the speed of said motor.

24. A motor comprising in combination means for generating an effective counter-electromotive force, comprising two components, and means for varying one of said components to adjust the speed of said motor.

25. A motor comprising one winding adapted to be connected with a source of current, a second winding, adjustable means for inducing a controllable counter-electromotive force in said second winding, the two windings being positioned and mounted so that currents through said windings will react to produce relative movement thereof.

26. A dynamo electric machine comprising two relatively movable windings connected in series and adapted to be supplied with current from a direct current source, of taps connected with one of said windings for removing alternating current, and means for varying the frequency and potential of said alternating current, comprising means co-acting with one of said windings, to vary the speed of said dynamo electric machine.

27. A dynamo electric machine comprising two relatively movable windings, one of which is adapted to be supplied with current from a direct current source, of taps connected with one of said windings for removing alternating current, and means for varying the frequency and potential of said alternating current, comprising means co-acting with one of said windings, to vary the speed of said dynamo electric machine.

28. A dynamo electric machine comprising a pair of relatively movable windings, one of which is adapted to be connected with a source of direct current, taps connected with one of said windings for the removal of direct current, and means for varying the potential of said direct current, comprising means for varying the speed of said dynamo electric machine, and for causing the voltage of the direct current removed from said taps to vary directly with the speed of said dynamo electric machine.

29. A dynamo electric machine comprising a pair of relatively movable windings, one of which is adapted to be connected with a source of direct current, taps connected with one of said windings for the removal of direct current, and means for varying the potential of said direct current, comprising means for causing the voltage of the direct current removed from said taps to vary inversely with the speed of said dynamo electric machine.

30. A dynamo electric machine comprising a pair of relatively movable windings adapted to be connected with a source of direct current, a series of taps connected with said windings for the removal of direct currents, and means for simultaneously varying the potentials impressed on said taps, comprising means for varying the speed of said dynamo electric machine.

In witness whereof, I hereunto subscribe my name this 24th day of February, 1920.

LEIGH J. STEPHENSON.

Witnesses:
EARL F. PIERCE,
EDNA V. GUSTAFSON.